(12) United States Patent
Sweldens

(10) Patent No.: US 6,778,615 B1
(45) Date of Patent: Aug. 17, 2004

(54) METHOD AND APPARATUS FOR BLOCK NONCOHERENT DECODING

(75) Inventor: Wim Sweldens, New Providence, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 812 days.

(21) Appl. No.: 09/580,751

(22) Filed: May 30, 2000

(51) Int. Cl.$^7$ ................................................. H03D 1/00
(52) U.S. Cl. ........................................ 375/341; 714/794
(58) Field of Search ................................ 375/262, 341, 375/265; 714/794, 795

(56) References Cited

U.S. PATENT DOCUMENTS 5,514,998 A * 5/1996 Kim ........................... 329/300
6,389,079 B2 * 5/2002 Raheli et al. ............... 375/262

OTHER PUBLICATIONS

D. Warrier et al., "Noncoherent Communication in Space and Time," http://www.ece.ucsb.edu, pp. 1–41, Mar. 2000.
B.M. Hochwald et al., "Unitary Space–Time Modulation for Multiple–Antenna Communications in Rayleigh Flat Fading," http://mars.bell-labs.com/, pp. 1–40, 2000.
D. Divsalar and M.K. Simon, "Maximum–Likelihood Differential Detection of Uncoded and Trellis Coded Amplitude Phase Modulation over AWGN and Fading Channels—Metrics and Performance," IEEE Trans. on Comm., vol. 42, No. 1, pp. 76–89, 1994.
R.V. Nobelen and D. Taylor, "Multiple Symbol Differentially Detected Multilevel Codes for the Rayleigh–Fading Channel," IEEE Trans. on Comm., vol. 45, No. 12, pp. 1529–1537, 1997.

* cited by examiner

*Primary Examiner*—Stephen Chin
*Assistant Examiner*—Kevin Kim

(57) ABSTRACT

Received symbols are decoded in a communication system using a maximum likelihood block noncoherent decoding algorithm. The noncoherent decoding algorithm utilizes a set of test words determined for a given block of symbols based on a corresponding set of crossover angles which specify transitions between the test words. Advantageously, the decoding algorithm provides exact maximum likelihood block decoding having a complexity which is independent of the data rate of the symbols and linear-logarithmic in the block length.

15 Claims, 1 Drawing Sheet

METHOD AND APPARATUS FOR BLOCK NONCOHERENT DECODING

FIELD OF THE INVENTION

The present invention relates generally to decoding techniques for use in communication systems, and more particularly to noncoherent decoding techniques for use in such systems.

BACKGROUND OF THE INVENTION

In communication over a fading channel in which the fading is unknown but approximately constant over multiple symbol periods, coherent decoding requires explicit learning of the channel. As a result, its overhead may be excessive, particularly in mobile or multiple antenna settings. Differential modulation is traditionally used when the channel changes the symbol phase in an unknown, but consistent or continuously varying way. Standard differential modulation techniques such as differential M-ary phase shift keying (DMPSK) encode the data in the phase difference between two consecutive symbols. Under the assumption that the unknown fading coefficient changes little between two symbols, the difference in phase is preserved and can be used to carry data. Differential modulation allows the use of noncoherent decoding, thereby avoiding the excessive overhead typically associated with coherent decoding.

Unfortunately, the performance of noncoherent differential decoding is generally inferior to that of coherent decoding. For example, in D. Divsalar and M. K. Simon, "Maximum-likelihood differential detection of uncoded and trellis codes amplitude phase modulation over AWGN and fading channels—metrics and performance," IEEE Trans. on Comm., Vol. 42, No. 1, pp. 76–89, 1994, it is shown that when the number of phases M gets large, DMPSK suffers from a 3 dB performance loss compared to coherent MPSK decoding. A portion of this loss can be recouped by using maximum likelihood (ML) decoding over blocks of multiple symbols, as described in the above-cited D. Divsalar and M. K. Simon reference. However, the computational complexity of the standard ML algorithm for exact noncoherent decoding is exponential in both the rate $R=\log_2 M$ and the block length T.

In D. Warrier and U. Madhow, "Noncoherent Communication in Space and Time," http://www.ece.ucsb.edu/Faculty/Madhow/Publications/noncoh_itsubmission, there is described an approximate ML decoding algorithm having a complexity which in some circumstances is linear in the block length T. However, in order for this approximate algorithm to provide a constant approximation quality, its complexity needs to grow quadratically in the block length T, i.e. the complexity of the approximate algorithm for the case of constant approximation quality is given by $O(T^2)$, where $O(\cdot)$ denotes "on the order of."

A need therefore exists for an improved noncoherent decoding technique which provides improved performance and reduced complexity relative to the conventional techniques described above.

SUMMARY OF THE INVENTION

The present invention provides an improved noncoherent decoding technique for exact maximum likelihood (ML) decoding over blocks of multiple symbols. Unlike the conventional standard noncoherent decoder previously described, the complexity of which is exponential in both the rate R and the block length T, a noncoherent decoder configured in accordance with the present invention has a complexity which is independent of the rate R and linear-logarithmic in the block length ($O(T \log T)$).

In accordance with the invention, received symbols are decoded in a communication system using an exact maximum likelihood block noncoherent decoding algorithm. The noncoherent decoding algorithm utilizes a set of test words determined for a given block of symbols based on a corresponding set of crossover angles which specify transitions between the test words. The set of test words in an illustrative embodiment are given by vectors $g^{[t]}$ for $1 \leq t \leq T$, where t denotes a particular received symbol in a block of T symbols and each of the vectors includes T elements. The first one of the test words maybe a vector $g^{[1]}$ which is selected as an output of a coherent maximum likelihood decoding operation for a case in which a channel fading coefficient has a value of zero. The crossover angle $\alpha$, for a given received symbol t in a block of T received symbols is computed as a function of the selected first test word and the corresponding received signal component. The set of crossover angles computed using the first test word are arranged in a sorted list, and are used to determine transitions between the test words. An output of a noncoherent decoding operation for a given received symbol t is given by:

$$\hat{g} = g^{[\hat{t}]} \text{ with } \hat{t} = \arg \max_{1 \leq t \leq T} \mathcal{L}(g_t),$$

where $\mathcal{L}(g_t)$ is a likelihood computed for a given one of the test words as a function of a set of recursively computed inner products involving the block of T received symbols.

The noncoherent decoding algorithm may be implemented using a sliding window corresponding to the block length T, such that the decoding algorithm maintains a sorted list of T crossover angles and T inner products computed using the test words. When the sliding window is adjusted by one position, a crossover angle is dropped from the sorted list and a new crossover angle is determined and inserted in the sorted list, and the inner products are then updated based on the current sorted list.

The present invention can be used with a variety of different types of modulation, including but not limited to phase shift keying (PSK) modulation and quadrature amplitude modulation (QAM). In addition, the invention can be implemented in single-antenna or multiple-antenna communication systems.

DETAILED DESCRIPTION OF THE INVENTION

Figure 1:
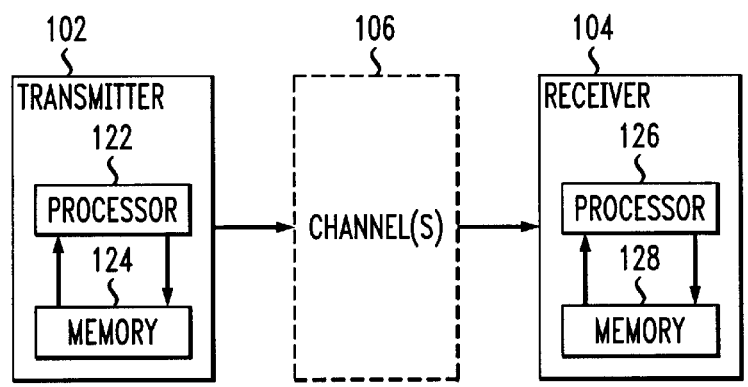
FIG. 1 is a simplified block diagram of an exemplary communication system in which the invention may be implemented.

FIG. 1 shows a simplified block diagram of a communication system 100 in which the invention may be implemented. The system 100 includes a transmitter 102 and a receiver 104 which communicate over a set of one or more channels 106. The transmitter 102 includes a processor 122 and a memory 124 which are configured to control various functions of the transmitter 102 through the use of appropriately-configured hardware, firmware or software elements. Similarly, the receiver 104 includes a processor 126 and a memory 128 which are configured to control various functions of the receiver 104 in accordance with appropriately-configured hardware, firmware or software elements. For example, processor 126 and memory 128 of receiver 104 may interact to execute stored program instructions for implementing noncoherent decoding of differential symbols received in receiver 104, in a manner to be described in detail below. It will be apparent to those skilled in the art that the transmitter 102 and receiver 104 will generally include additional elements not shown in the simplified diagram, such as, e.g., baseband and radio frequency (RF) signal processing elements, antennas, filters, etc. One or more of such elements may be controlled by or implemented in whole or in part using software stored in memories 124 and 128 and executed by the corresponding processors 122 and 126, respectively.

The present invention in an illustrative embodiment provides a noncoherent decoding technique for exact maximum likelihood (ML) decoding over blocks of multiple symbols. Unlike the conventional standard noncoherent decoder previously described, the complexity of which is exponential in both the rate R and the block length T, a noncoherent decoder configured in accordance with the present invention has a complexity which is independent of the rate R and linear-logarithmic in the block length (O(T log T)). As will be described in greater detail below, such a noncoherent decoder may be implemented in whole or in part in software within the receiver 104 of FIG. 1.

The invention will be illustrated using the following channel model. At time t the signal $s_t$ is transmitted from a transmit antenna of transmitter 102 and subsequently the signal $x_t$ is received at a receive antenna of the receiver 104. It is assumed that the channel 106 is a Rayleigh fading channel given by:

$$x_t = \sqrt{\rho} h_t s_t + w_t, \ t = 0, 1, \ldots \quad (1)$$

The additive noise $w_t$ is independent, identically complex Gaussian distributed CN(0,1), which is the complex Gaussian zero-mean unit-variance distribution. The complex-valued fading coefficient $h_t$ is CN(0,1) distributed but not necessarily independent. The signals are normalized to have average energy one, i.e., $E|s_t|^2 = 1$, and then $\rho$ represents the expected signal-to-noise ratio (SNR) at the receiver.

For a data rate of R bits per channel, $M = 2^R$ symbols are required. A common technique is phase shift keying (PSK) which uses symbols that are Mth roots of unity $$v_m = e^{2\pi i m/M} \ m = 0, \ldots, M-1. \quad (2)$$

In the case of a known channel, assuming that the data to be transmitted is a sequence of integers $z_1, z_2, \ldots$ with $z_t \in \{0, \ldots, M-1\}$ and that the receiver knows the fading coefficient, then the transmitter simply sends $$s_t = v_{z_t}.$$

The standard ML coherent decoder for decoding the transmitted sequence is given by $$\hat{z}_t = \arg \max_{0 \leq m < M} |x_t - h_t v_m| = \lfloor \arg(x_t/h_t) M / (2\pi) \rceil. \quad (3)$$

Here arg is the phase of a complex number and $\lfloor x \rceil$ stands for the integer closest to x: $\lfloor x \rceil = \lfloor x + \frac{1}{2} \rfloor$. In this conventional ML coherent decoding case, the decoding is done per symbol and there is no advantage from using block decoding. Note that the decoding depends only on the phase of the fading coefficient and not its magnitude.

In the case of an unknown channel, the receiver does not know the fading coefficient, and therefore block modulation and decoding are used. Typically it is assumed that the fading is constant over blocks of length 2, i.e., it is assumed that $h_t \approx h_{t-1}$. The transmitter transmits a block $[1 \ v_{z_t}]$, where the first symbol can be thought of as a training symbol. The receiver uses the phase of the first received symbol as an estimate of the fading phase. However, using non-overlapping blocks reduces the data rate by half. Therefore, when the fading varies continuously, one generally lets the blocks overlap. The transmitter sends the symbols $$s_t = v_{z_t} s_{t-1} t = 1, 2, \ldots \ (s_0 = 1). \quad (4)$$

The standard exact ML noncoherent decoder in this case is given by $$\hat{z}_t = \arg \min_m |x_t - x_{t-1} v_m| = \lfloor \arg(x_t / x_{t-1}) M / (2\pi) \rceil, \ t = 1, 2, \ldots \quad (5)$$

By comparing Equation (5) with Equation (3), it can be seen that $x_{t-1}$ is indeed used to estimate the phase of the fading. This becomes more clear by substituting Equation (4) in Equation (1) to obtain (using $h_t = h_{t-1}$):

$$x_t = x_{t-1} v_{z_t} + w_t - v_{z_t} w_{t-1} = x_{t-1} v_{z_t} + \sqrt{2} w'_t,$$

where $w'_t$ is identically distributed CN(0,1). This configuration is equivalent to the known channel model with fading $x_{t-1}$ and twice the noise power, resulting in the above-noted 3 dB loss relative to the coherent decoder.

As previously noted, if the fading coherence interval is sufficiently large, one can recoup a portion of the 3 dB noncoherent decoding loss through the use of ML decoding over blocks of multiple symbols. Assume that the fading is approximately constant over T symbol intervals and the sent and received symbols are grouped into non overlapping blocks of length T. Boldface will be used to denote vectors of length T, and the components of a vector x are given by $x_t$ for $1 \leq t \leq T$. The channel model can now be written as $$x = \sqrt{\rho} hs + w, \quad (6)$$

where x, s, w$\in \mathbb{C}^T$ and h$\in \mathbb{C}$. Also consider the additive group $G = Z_M^T$: the elements are length T vectors with integer components between 0 and M−1 and addition is done component wise and modulo M. The group G clearly has $M^T$ elements. The all one element is 1$\in$G and the standard unit vectors are $e_t \in$G for $1 \leq t \leq T$. Let $\eta = v_1 = \exp(2\pi i/M)$ and define the exponential map for g$\in$G as $$\eta^g = [\eta^{g_1} \ldots \eta^{g_T}].$$

The transmitter uses uncoded vectors $\eta^g$ for g$\in$G. After averaging over the unknown channel phase, the likelihood function at the receiver is a monotone function of $$\mathcal{L}(g) = |x^* \eta^g|,$$

and the ML noncoherent decoder thus is $$\hat{g} = \arg \max_{g \in G} \mathcal{L}(g). \tag{7}$$

The ML decoder is unaffected by the phase of $x^*\eta^g$. Integer vectors g that differ by a multiple of the all one vector 1 hence are indistinguishable at the receiver, i.e., $\mathcal{L}(g)=\mathcal{L}(g+1)$. A suitable codebook for the ML decoder thus comprises equivalence classes of G each with T elements that differ by a multiple of the all one vector 1. As representative examples, one can take the vectors with first component $g_1=0$ such that there are $M^{T-1}$ distinct codewords in the codebook.

A naive implementation of the ML noncoherent decoder would compute the likelihood $\mathcal{L}(g)$ for every codeword g. The complexity of such an implementation is $O(2^{R(T-1)})$, i.e., exponential in both the rate and the block length. This is a high price to pay in comparison with the standard two symbol differential decoding of Equation (5) which has a constant cost per symbol.

As previously noted, an illustrative embodiment of the present invention provides a noncoherent decoding technique for exact ML decoding over blocks of multiple symbols. Advantageously, the noncoherent decoding technique in the illustrative embodiment has a complexity $O(T \log T)$, and thus a cost per symbol of $O(\log T)$.

The noncoherent decoding technique of the illustrative embodiment will now be described in detail. First observe from Equation (3) that the coherent decoding decision does not depend on the magnitude of the fading coefficient, but only on its phase. One can thus let $h=e^{-i\varphi}$. If $\varphi$ is known then the coherent ML decoder as a function of $\varphi$ is given by $$\Gamma(\varphi) = \arg \min_{g \in G} \|x - e^{-i\varphi}\eta^g\| =$$

$$\arg \max_{g \in G} Re(x^* e^{-i\varphi}\eta^g) = \lfloor (\arg x + \varphi \mathbf{1})M/(2\pi) \rfloor \bmod M.$$

As noted above, coherent ML decoding is performed in a componentwise manner. It will now be determined whether there is a value $\hat{\varphi}$ for $\varphi$ for which the coherent decoder gives the same answer as the noncoherent decoder of Equation (7), i.e., $\hat{g}=\Gamma(\hat{\varphi})$. First note that $$\Gamma(\varphi) = \arg \max_{g \in G} |x^*\eta^g| \cos(\arg(x^*\eta^g) - \varphi).$$

Since $g=\hat{g}$ maximizes the first factor in the above product, if $\hat{\varphi}=\arg(x^*\eta^{\hat{g}})$ then the cosine is also maximal at $g=\hat{g}$. Thus $$\hat{g}=\Gamma(\hat{\varphi}) \text{ with } \hat{\varphi}=\arg(x^*\eta^{\hat{g}}).$$

This does not lead directly to a noncoherent decoding algorithm since $\hat{\varphi}$ in turn depends on $\hat{g}$. But it shows that a value for $\varphi$ exists where the coherent decoder agrees with the noncoherent decoder. One can then in theory determine this value by scanning all possible values for $\varphi$, computing the corresponding coherent decoder equation, and picking the one with the largest noncoherent likelihood:

$$\hat{g} = \Gamma(\hat{\varphi}) \text{ with } \hat{\varphi} = \arg \max_{\varphi \in [0,2\pi)} \mathcal{L}(\Gamma(\varphi)).$$

An important observation underlying the resulting noncoherent decoding algorithm of the illustrative embodiment is that when scanning all phases $\varphi \in [0,2\pi), \Gamma(\varphi)$ takes on only T distinct codewords. These distinct codewords are referred to herein as test words $g^{[t]}$ for $1 \le t \le T$. This can be seen as follows. First observe that $$\Gamma(\varphi+2\pi/M)=\Gamma(\varphi)+1, \tag{8}$$

which is a codeword equivalent to $\Gamma(\varphi)$. Hence the above-noted scanning process can be restricted to $\varphi \in [0,2\pi/M)$. Starting with $\varphi=0$ and $\Gamma(0)$, the first test word is $g^{[1]}=\Gamma(0)$. As is apparent from Equation (8), each component $x_t$ decodes to $g_t^{[1]}$ when $\varphi=0$ and to $g_t^{[1]}+1$ when $\varphi=2\pi/M$. For each component $x_t$, there is a value for $\varphi$ in $[0,2\pi/M)$ where this crossover happens. This value is referred to herein as the crossover angle $\alpha_t$. Note that since the ML decoder is done componentwise and the scan is performed over $2\pi/M$, the crossover happens only once. The crossover angle for component t can be found as $$\alpha_t=(g_t^{[1]}+\tfrac{1}{2})2\pi/M-\arg x_t.$$

Figure 2:
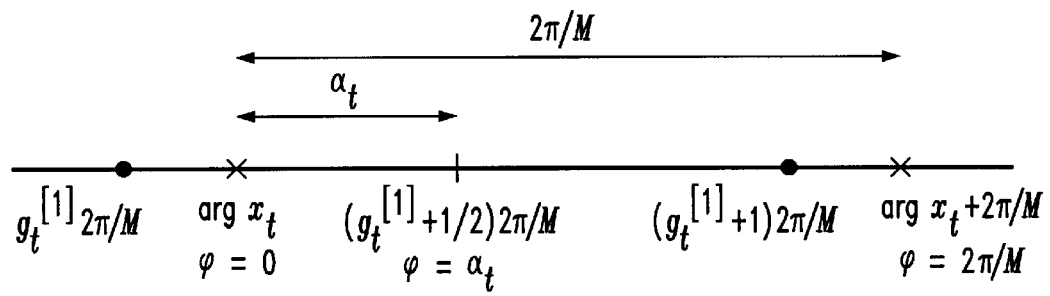
FIG. 2 illustrates the crossover angle in an illustrative noncoherent decoding technique in accordance with the present invention.

FIG. 2 illustrates the above-described crossover in a noncoherent decoding technique of the present invention. When $\varphi=0$, the closest multiple of $2\pi/M$ to $\arg x_t$ is $g_t^{[1]}$, and so the component $x_t$ decodes to $g_t^{[1]}$. However, when $\arg x_t+\varphi$ is larger than $(g_t^{[1]}+\tfrac{1}{2})2\pi/M$, i.e., for $\varphi$ greater than the crossover angle $\alpha_t$, the closest multiple is $g_t^{[1]}+1$, and so the component $x_t$ will decode to $g_t^{[1]}+1$.

In order to determine the test words $g^{[t]}$ for $1 \le t \le T$, the crossover angles determined in the above manner are sorted, at a cost of $O(T \log T)$. Let $u_t$ be the index of the sorted crossover angles so that $$\alpha_{u_t} \le \alpha_{u_{t+1}} \text{ for } 1 \le t \le T.$$

The remaining T−1 test words can then be determined as follows. Let the angle $\varphi$ scan from 0 to $2\pi/M$. At $\varphi=0$ one decodes to test word $g^{[1]}$. The first crossover angle encountered is $\alpha_{u_1}$. Thus the next test word is obtained by adding one (modulo M) to the $u_1$th component: $g^{[2]}=g^{[1]}+e_{u_1}$. In general $$g^{[t]}=g^{[t-1]}+e_{u_{t-1}} \text{ for } 2 \le t \le T$$

For $t=T+1$ one obtains $g^{[1]}+1$ which is equivalent to $g^{[1]}$. There are thus T distinct test words determined in the above-described process.

Figure 3:
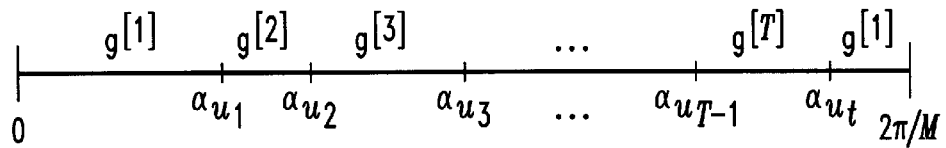
FIG. 3 illustrates the manner in which an interval is divided into T portions by a set of crossover angles in an illustrative noncoherent decoding technique in accordance with the present invention.

FIG. 3 illustrates the manner in which the sorted crossover angles divide the interval $[0,2\pi/M)$ into T portions, with each of the portions corresponding to one test word. The ML decoder is given by $$\hat{g} = g^{[\hat{t}]} \text{ with } \hat{t} = \arg \max_{1 \le t \le T} \mathcal{L}(g_t).$$

As previously noted, naively computing $\mathcal{L}(g)$ costs $O(T)$ operations per vector. However, because of the special structure of the test words as described above, one can compute the likelihoods of all T test words in $O(T)$, as follows. First compute the inner products $P^{[t]}=x^*\eta^{g^{[t]}}$. The first one costs $O(T)$, but each remaining one can be computed recursively at constant cost as $$P^{[t]}=P^{[t-1]}+x_t^*\eta^{g^{[1]}}(\eta-1).$$

The likelihoods are now given as $\mathcal{L}(g_t)=|P^{[t]}|$. Because of the sorting, the overall complexity of the algorithm is $O(T \log T)$. The cost per symbol is thus $O(\log T)$.

It should be noted that because of the above-described equivalence in G, the actual rate in the illustrative embodiment is R(T−1)/T. The nonoverlapping blocks all have their first symbol equal to one. However, by multiplying an entire block with the last symbol of the previous block, one can let the blocks overlap by one and the rate becomes R. This can be viewed as a block differential technique.

The above-described exact ML noncoherent decoding algorithm can be implemented using a software program such as the example Matlab program shown below.

|   | function g = decode (x, M) |
|---|---|
| 1 | eta = exp (2*pi*i/M); |
| 2 | arg = angle (x) *M/ (2*pi); |
| 3 | g = round (arg); |
| 4 | [void, u] = sort (g-arg); |
| 5 | p = conj (x) . *eta.^g; |
| 6 | v = [sum(p) ; p (u) * (eta−1) ]; |
| 7 | [void, best] = max (abs (cumsum (v))); |
| 8 | g (u(1: best−1)) = g (u(1:best−1)) + 1; |
| 9 | g = mod (g-g(1), M); |

Line Comments:
2: Compute the phases of the x vector in multiples of 2π/M.
4: Sort the crossover angles. There is no need to include the constant π/M.
5: Compute the terms of the first inner product $P^{[1]}$.
6: Arrange all the terms of the recursion in a vector.
7: Compute all the inner products, take their absolute values and keep the index of the largest one.
8: Build the best test word $g^{[i]}$.
9: Find the representative of the equivalence class.

When implementing the above-described algorithm, a sliding window of length T may be used. In such an implementation, the algorithm keeps track of T sorted crossover angles and T inner products. Whenever the window moves by one, a new crossover angle gets inserted in the sorted list and one gets dropped, and the inner products are then updated.

It can be shown that in order for the above-noted conventional approximate ML noncoherent decoding algorithm to have a nonzero asymptotic probability to find the exact ML answer, its complexity becomes quadratic in the block length ($O(T^2)$). As previously noted, the present invention overcomes this problem of the approximate ML noncoherent decoding algorithm by providing an exact ML noncoherent decoding algorithm with complexity that is linear-logarithmic in the block length (O(T log T)).

It should be emphasized that the above-described embodiment of the invention is illustrative only, and numerous alternative embodiments within the scope of the appended claims will be apparent to those skilled in the art. For example, the invention could be used with other types of modulation, such as quadrature amplitude modulation (QAM). As another example, the invention could be used in multiple antenna differential modulation applications. The invention may thus be implemented in numerous communication applications other than those described herein, and can be applied to single-antenna or multiple-antenna reception of data, speech, audio, video or any other desired type of information.

What is claimed is:

1. A method of decoding received signals in a communication system, the method comprising the steps of:
   receiving one or more symbols; and
   implementing a maximum likelihood block noncoherent decoding operation for the received symbols, wherein the decoding operation utilizes a set of test words determined for a given block of symbols based on a corresponding set of crossover angles which specify transitions between the test words.

2. The method of claim 1 wherein the maximum likelihood block decoding operation comprises an exact maximum likelihood block decoding operation having a complexity which is independent of the data rate of the symbols and linear-logarithmic in the length of the block of symbols.

3. The method of claim 1 wherein the symbols comprise phase shift keying (PSK) symbols.

4. The method of claim 1 wherein the symbols comprise quadrature amplitude modulation (QAM) symbols.

5. The method of claim 1 wherein the communication system comprises a multiple antenna communication system.

6. The method of claim 1 wherein the set of test words are given by vectors $g^{[t]}$ for $1 \leq t \leq T$, where t denotes a particular received symbol in a block of T symbols and each of the vectors includes T elements.

7. The method of claim 1 wherein a first one of the test words comprises a vector $g^{[1]}$ which is selected as an output of a coherent maximum likelihood decoding operation for a case in which a channel fading coefficient has a value of zero.

8. The method of claim 1 wherein the crossover angle $\alpha_t$ for a given received symbol t in a block of T received symbols, where $1 \leq t \leq T$, is given by:

$$\alpha_t = (g_t^{[1]} + \frac{1}{2}) 2\pi/M - \arg x_t$$

where $g_t^{[1]}$ is a tth element of a first one of the set of test words, M is the number of different symbols, and $x_t$ is a received signal component corresponding to symbol t.

9. The method of claim 1 wherein the set of test words are determined by selecting a first one of the test words based on a channel fading coefficient having a value of zero, calculating the crossover angles using the first one of the test words, sorting the crossover angles in an increasing order, and determining each of the remaining test words corresponding to the sorted crossover angles as a function of at least one previous test word.

10. The method of claim 1 wherein an output of the noncoherent decoding operation for a given received symbol t in a block of T received symbols, $1 \leq t \leq T$, is given by:

$$\hat{g} = g^{[\hat{t}]} \text{ with } \hat{t} = \arg \max_{1 \leq t \leq T} \mathcal{L}(g_t),$$

where $\mathcal{L}(g_t)$ is a likelihood computed for a given one of the test words as a function of a set of recursively computed inner products involving the block of T received symbols.

11. The method of claim 1 wherein each of a set of nonoverlapping blocks of received symbols have their first symbol set to a specified value.

12. The method of claim 1 wherein each symbol in a given block of received symbols is multiplied prior to transmission by a last symbol of a previous block and the blocks are permitted to overlap by one symbol period.

13. The method of claim 1 wherein the noncoherent decoding operation is implemented using a sliding window corresponding to a block length T of the block of symbols such that the decoding operation maintains a sorted list of T crossover angles and T inner products computed using the test words, and further wherein when the window is adjusted by one position, a crossover angle is dropped from the sorted list and a new crossover angle is determined and inserted in the sorted list, and the inner products are then updated based on the current sorted list.

14. An apparatus for decoding received signals in a communication system, the apparatus comprising:
    a receiver comprising a processor coupled to a memory the receiver being operative to receive one or more symbols, and to implement a maximum likelihood block noncoherent decoding operation for the received symbols, wherein the decoding operation utilizes a set of test words determined for a given block of symbols based on a corresponding set of crossover angles which specify transitions between the test words.

15. An article of manufacture comprising a machine-readable medium for storing one or more software programs for use in decoding received signals in a communication system, the software programs when executed by a processor implementing a maximum likelihood block noncoherent decoding operation for received symbols, wherein the decoding operation utilizes a set of test words determined for a given block of symbols based on a corresponding set of crossover angles which specify transitions between the test words.

* * * * *